(12) United States Patent
Franklin et al.

(10) Patent No.: US 8,732,465 B2
(45) Date of Patent: May 20, 2014

(54) METHOD AND APPARATUS FOR SOURCE IDENTIFICATION FOR KEY HANDLING FOLLOWING A HANDOVER FAILURE

(75) Inventors: Steven Franklin, Guildford Surrey (GB); Stuart Geary, Fleet Hampshire (GB); Keiichi Kubota, Weybridge Surrey (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/500,243

(22) PCT Filed: Jul. 28, 2010

(86) PCT No.: PCT/IB2010/053440
§ 371 (c)(1),
(2), (4) Date: Apr. 4, 2012

(87) PCT Pub. No.: WO2011/039655
PCT Pub. Date: Apr. 7, 2011

(65) Prior Publication Data
US 2012/0216039 A1 Aug. 23, 2012

Related U.S. Application Data

(60) Provisional application No. 61/246,723, filed on Sep. 29, 2009.

(51) Int. Cl.
*H04L 9/32* (2006.01)
(52) U.S. Cl.
USPC ............ 713/168; 380/270; 370/331; 455/411
(58) Field of Classification Search
None
See application file for complete search history.

(56) References Cited

U.S. PATENT DOCUMENTS 8,311,512 B2 * 11/2012 Kitazoe et al. ................ 455/410
8,331,906 B2 * 12/2012 Forsberg et al. .............. 455/410

FOREIGN PATENT DOCUMENTS

| EP | 1915022 | * | 4/2003 |
| EP | 1841260 | A2 | 10/2007 |
| EP | 1915022 | A1 | 4/2008 |
| EP | 1926281 | A2 | 5/2008 |
| WO | WO-2009020789 | * | 7/2008 |
| WO | WO-2009020789 | A2 | 2/2009 |

OTHER PUBLICATIONS

3GPP TSG-RAN WG2 Meeting #67; Shenzen, China, Aug. 24-28, 2009; Nokia Corporation, Nokia Siemens Networks; Clarification on key mapping and storing after successful handover from UTRAN.
3rd Generation Partnership Project; Technical Specification Group Core Network and Terminals; Non-Access-Stratum (NAS) protocol for Evolved Packet System (EPS); Stage 3 (Release 9); 3GPP TS 24.301 v9.0.0 (Sep. 2009).
3rd Generation Partnership Project; Technical Specification Group Services and System Aspects; Single Radio Voice Call Continuity (SR-VCC); Stage 2 (Release 9); 3GPP TS 23.216 v9.1.0 (Sep. 2009).

(Continued)

*Primary Examiner* — Fikremariam A Yalew
(74) *Attorney, Agent, or Firm* — Mintz, Levin, Cohn, Ferris, Glovsky & Popeo, P.C.

(57) ABSTRACT

A method of enabling key handling for a handover between different domains may include determining whether an indication of a potential key mismatch is present responsive to an attempt to conduct a handover between a first domain and a second domain, and defining validity of a most recent key set used for ciphering communication between a mobile terminal and a network device based on a result of the determining.

16 Claims, 4 Drawing Sheets

(56) References Cited

OTHER PUBLICATIONS

3rd Generation Partnership Project; Technical Specification Group Services and System Aspects; 3G Security; Security Architecture; (Release 8); 3GPP TS 33.102 v8.3.0 (Jun. 2009).

3rd Generation Partnership Project; Technical Specification Group Services and System Aspects; 3GPP System Architecture Evolution (SAE): Security architecture; (Release 8); 3GPP TS 33.401 v8.4.0 (Jun. 2009).

3GPP TSG-RAN WG2 Meeting #68; Jeju, South Korea; Nov. 9-13, 2009; 25331_CR_(Rel-9)_R2-096911 SR-VCC; Nokia Corporation; Nokia Siemens Networks; Invalidation of security key after failed. SR-VCC handover.

3GPP TSG-RAN WG2 Meeting #67bis; Miyazaki, Japan; Oct. 12-16, 2009; 25331_CR_(Rel-9)_R2-096063 IRHO; Nokia Corporation; Nokia Siemens Networks; Correction to UE behavior after handover to UTRAN from EUTRAN or GERAN.

3GPP TSG-RAN WG2 Meeting #68; Jeju, South Korea Nov. 9-13, 2009; R2-096904 SR-VCC disc; Nokia Corporation; Nokia Siemens Networks; Ps to CS key-set mapping when performing SR-VCC.

3GPP TSG-SA3 (Security) Meeting SA3#58, Feb. 1-5, 2010, Xi'An China; S3-100174-PS. HO failure-v3-R9; Nokia Corporation; Nokia Siemens Networks; Desynchronization of PS keys between the UE and the network in case of PS HO failure.

PCT International Search Report dated Jan. 21, 2011, for PCT application No. PCT/IB2010/053440.

* cited by examiner

METHOD AND APPARATUS FOR SOURCE IDENTIFICATION FOR KEY HANDLING FOLLOWING A HANDOVER FAILURE

RELATED APPLICATION

This application was originally filed as Patent Cooperation Treaty Application No. PCT/IB2010/053440 filed Jul. 28, 2010, which claims priority to U.S. Application No. 61/246,723 Sep. 29, 2009.

TECHNOLOGICAL FIELD

Embodiments of the present invention relate generally to communication in multiple radio access technology (RAT) environments and/or in single-RAT environments and, more particularly, relate to an apparatus and method for enabling key handling for inter-domain mobility (e.g. single radio voice call continuity—SR-VCC).

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Such increased ease of information transfer and convenience to users has recently been accompanied by an increased ability to provide mobile communications at a relatively low cost. Accordingly, mobile communication devices are becoming ubiquitous in the modern world. With the rapid expansion of mobile communications technology, there has been a related rapid expansion in those services that are demanded and provided via mobile communication devices.

Over the history of mobile communications, there have been many different generations of systems developed to enable the use of such communication devices. The first generations of these systems were sometimes developed independently and, at least initially, were not necessarily usable in cooperation with other systems. However, cooperation between communication system developers began to be employed so that new technologies could be enabled to have the potential for synergistic cooperation with other technologies in order to increase overall capacity. Thus, a mobile terminal operable in second generation (for example, 2G) systems such as GSM (Global System for Mobile communications) or IS-95, which replaced the first generation of systems, may in some cases be useable in cooperation with newer generation systems such as third generation systems (for example, 3G) and others that are currently being developed (for example, E-UTRAN (Evolved Universal Terrestrial Radio Access Network)).

The ability of a particular mobile terminal to access multiple systems or communicate via multiple radio access technologies (multi-RATs) is sometimes referred to as "multi-radio access" (MRA). An MRA capable terminal may therefore be enabled to transfer between different RATs (for example, UTRAN (Universal Terrestrial Radio Access Network), E-UTRAN, GERAN (GSM EDGE Radio Access Network), HSPA (High Speed Packet Access)). The goal of such transfers is, of course, to maintain communication continuity through each transfer. The Third Generation Partnership Project (3GPP) has defined various specifications to attempt to standardize aspects of the mechanisms used to achieve this and other goals. One provision of the 3GPP standards provides for handing over of a voice session over E-UTRAN to GERAN as a circuit switched (CS) voice call (e.g., handing over from a packet switched (PS) connection to a CS connection). In other words, for example, SR-VCC provides a mechanism by which to handover from a Voice over Internet Protocol (VoIP) call over a data bearer to a traditional voice call over a CS bearer. However, SR-VCC is also capable of operation in a single RAT environment. For example, a device may be handed over from HSPA to UTRAN where HSPA is part of the UTRAN.

Additionally, other inter-domain handover situations beyond SR-VCC are also possible. One principle or goal for implementation of standards related solutions is to avoid or reduce impacts on a target access network (for example, GERAN). In particular, with respect to SR-VCC from E-UTRAN toward a pre-release 8 target network, it may be desirable to utilize deployed target MSC (mobile switching center) and BSS (base station system) nodes without requiring substantial changes to such nodes to support the SR-VCC solution. However, in some cases, problems may arise due to the fact that the network and the user equipment (UE) being handed over may have different concepts of when a handover has been successfully completed. For example, in each of various different SR-VCC handover scenarios, the UE may consider the handover complete and then send a message indicating as much to the network. The network typically considers the handover complete after receipt of the message sent by the UE. Accordingly, with the difference in handover completion determination conditions established, it is possible for one side to store the new CS key set and the other side to dispose of the new CS key set and instead retain the previously stored CS key set. This scenario may occur, for example, in a handover failure case. More specifically, if the UE provides a transmission (e.g., a handover complete message) that is not received by the network, the UE will store the new CS key set, but the network will retain the old CS key set.

A key set mismatch is normally handled by checking for matching key set identity (KSI (key set identifier) or CKSN (ciphering key sequence number)) in the network and at the UE at a subsequent CS and/or PS connection, where a mismatch triggers a new key exchange (e.g., via authentication and key agreement (AKA)) procedure. A failure may occur when the newly mapped key set has a mapped identity that is the same as an existing stored key set. In particular, for example, if it is not known which of the two possible key sets is stored under the key set identity in the network and at the UE, a mismatch of key sets may be a very serious condition resulting in connection failure or badly ciphered audio. The above listed example is merely one situation where a key mismatch may result following a handover between specific different domains involving SR-VCC. However, it should be appreciated that similar problems related to key mismatches may occur in relation to other inter-domain handovers as well that may not necessarily involve SR-VCC or MRA.

Accordingly, changes to the key handling procedures for inter-domain handovers may be desirable.

BRIEF SUMMARY OF EXEMPLARY EMBODIMENTS

A method, apparatus and computer program product are therefore provided that may enable changes to inter-domain handover in multi-RAT or single-RAT environments. In this regard, for example, some embodiments of the present invention may provide a mechanism by which to avoid encountering situations in which a mismatch in key sets is encountered in order to, for example, support the SR-VCC solution.

In an example embodiment, a method of enabling key handling for a handover between different domains is provided. The method may include determining whether an indication of a potential key mismatch is present responsive to an attempt to conduct a handover between a first domain and a second domain, and defining validity of a most recent key set used for ciphering communication between a mobile terminal and a network device based on a result of the determining.

In another example embodiment, an apparatus for enabling key handling for a handover between different domains is provided. The apparatus may include at least one processor and at least one memory including computer program code. The at least one memory and the computer program code may be configured to, with the at least one processor, cause the apparatus to perform at least determining whether an indication of a potential key mismatch is present responsive to an attempt to conduct a handover between a first domain and a second domain, and defining validity of a most recent key set used for ciphering communication between a mobile terminal and a network device based on a result of the determining.

In another example embodiment, a computer program product for enabling key handling for a handover between different domains is provided. The computer program product includes at least one computer-readable storage medium having computer-executable program code instructions stored therein. The computer-executable program code instructions may include program code instructions for determining whether an indication of a potential key mismatch is present responsive to an attempt to conduct a handover between a first domain and a second domain, and defining validity of a most recent key set used for ciphering communication between a mobile terminal and a network device based on a result of the determining.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 a schematic block diagram of a wireless communications system according to an exemplary embodiment of the present invention;

DETAILED DESCRIPTION

Figure 1:
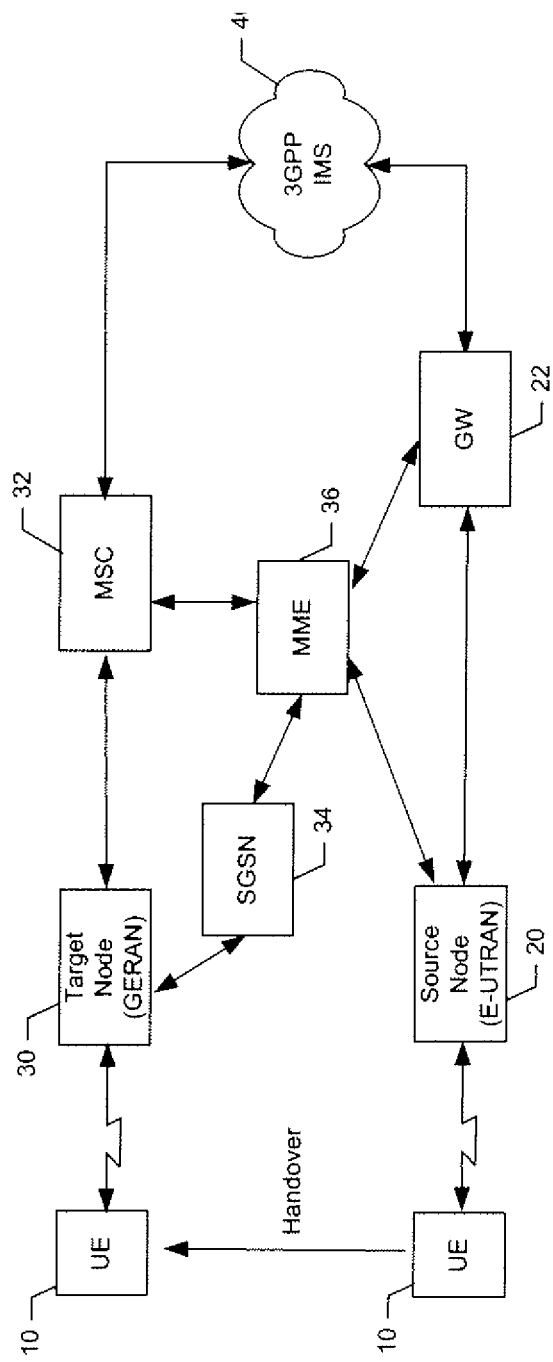

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Moreover, the term "exemplary", as used herein, is not provided to convey any qualitative assessment, but instead merely to convey an illustration of an example. Thus, use of any such terms should not be taken to limit the spirit and scope of embodiments of the present invention. Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Against the background provided above, an example in which an embodiment of the present invention is applicable will be described below in relation to a handover according to the SR-VCC solution. However, it should be appreciated that embodiments of the present invention also extend to other inter-domain solutions and are not limited to SR-VCC. Moreover, although handover from PS domain to CS domain is specifically described in one example, embodiments also apply to handovers from the CS domain to the PS domain. Thus, the examples described herein should not be viewed as being limiting with respect to application of embodiments of the present invention. As such, handling of keys that are mapped between different domains (e.g., the PS domain to the CS domain or other exemplary handovers) may be improved by embodiments of the present invention. Typically, for example, when performing SR-VCC handovers, ciphering is maintained in the switch from PS domain to CS domain by mapping new CS keys from the PS keys in use at the time of the handover. The generated CS keys are considered "fresh" because the mapping makes use of a NONCE value. Once the CS keys are generated and the SR-VCC handover completes successfully, a user equipment (UE) such as a mobile telephone or other mobile terminal may store the newly generated CS keys for use in subsequent CS connections. The network may also store the keys for subsequent use in support of CS connections with the UE. The identity of the new CS key set (e.g., KSI or CKSN) is copied directly from the identity of the PS key set. Accordingly, if there is a handover failure as described above, one side may store the new CS key set, while the other side may not, thereby causing a key mismatch.

Some embodiments of the present invention may provide a key handling process that may avoid key mismatch following a SR-VCC handover failure. In this regard, for example, some embodiments of the present invention may provide for a key handling process that directs invalidation of keys in situations where it can be determined that current conditions suggest a key mismatch is possible. As such, embodiments of the present invention may provide for network and UE side key handling procedures that may avoid key mismatching situations.

FIG. 1, one exemplary embodiment of the invention, illustrates a schematic block diagram of a wireless communications system according to an exemplary embodiment of the present invention. Referring now to FIG. 1, an illustration of one type of system that would benefit from embodiments of the present invention is provided. The system may include a plurality of network devices and one or more mobile terminals (for example, user equipment (UE) 10). The mobile terminals may be various different examples of mobile communication devices such as portable digital assistants (PDAs), pagers, mobile televisions, gaming devices, laptop computers, mobile phones, cameras, video recorders, audio/video players, radios, global positioning system (GPS) devices, or any combination of the aforementioned, and other types of voice and text communications devices. However, it should be understood that a mobile terminal as illustrated and hereinafter described is merely illustrative of one type of device that would benefit from embodiments of the present invention and, therefore, should not be taken to limit the scope of embodiments of the present invention.

In an exemplary embodiment, the UE 10 may include an antenna (or multiple antennas) for transmitting signals to and for receiving signals from a network node such as a base site, base station, access point, node B or e-node B. In an exemplary embodiment, the UE 10 may initially be in communication with a source node 20 (for example, an e-node B of E-UTRAN) and may be in the process of being handed over to a target node 30 (for example, a base station (BS) of GERAN). However, it should be understood that the target node 30 and the source node 20 could correspond to other base stations or access points corresponding to various other inter-domain handover scenarios (e.g., PS domain to CS domain, or CS domain to PS domain, etc).

During a handover process, a handover request message used to initiate the handover may be expected to provide an identity of the source node 20. As such, a mobile switching center (MSC) 32 associated with the target node may receive an identification from the source node 20 in connection with the handover request. The MSC 32 may be capable of routing calls to and from the UE 10 when the UE 10 is making and receiving calls while in communication with the target node 30. As such, the MSC 32 may provide a connection to landline trunks when the UE 10 is involved in a call. In addition, the MSC 32 may be capable of controlling the forwarding of messages to and from the UE 10, and may also control the forwarding of messages for the UE 10 to and from a messaging center. The MSC 32 may be coupled to a data network, such as a local area network (LAN), a metropolitan area network (MAN), and/or a wide area network (WAN) (for example, Third Generation Partnership Project (3GPP) Internet Protocol Multimedia Subsystem (IMS) 40). The source node 20 may also be coupled to the 3GPP IMS 40 via one or more gateway devices such as GW 22. GW 22 may represent a serving gateway (S-GW) and/or a packet data network gateway (PDN GW). The S-GW may route and forward user data packets, while also acting as a mobility anchor for the user plane during handovers within E-UTRAN or between E-UTRAN and other RATs (for example, GERAN). The PDN GW may provide connectivity for the UE 10 to external packet data networks by being the point of exit and entry of traffic for the UE 10.

The target node 30 of this example may also be coupled to a serving GPRS (General Packet Radio Service) support node (SGSN) 34. The SGSN 34 may be capable of performing functions similar to the MSC 32 for packet switched services. The SGSN 34 may be coupled to a mobility management element (MME) 36 that may also be in communication with the MSC 32 and the source node 20 and the GW 22. The MME 36 may be, among other things, responsible for idle mode UE tracking and paging procedures. The MME 36 may also handle GW selection for UE attachment and handover processes and may handle user authentication. As such, in some cases, the network (e.g., the MSC 32, the SGSN 34 or the MME 36) also handles the generation and/or storage of keys and the mapping of keys between the PS domain and the CS domain. However, it should be noted that another network entity other than the MME 36, the MSC 32, the SGSN 34, or another entity could alternatively be responsible for generation and/or storage of keys and mapping of keys.

For example, in a situation where a handover is requested, the MME 36 may coordinate handover of the UE 10 from source node 20 to the target node 30. As part of the handover process, the MSC 32 may provision a new CS key set for the UE 10, which may be provided for the UE 10 via the SGSN 34. The MME 36 may utilize the procedures described in 3GPP technical specifications TS-33.102 V.x.y and TS-33.401 V.x.y to handle mapping of the key sets between the PS domain and the CS domain. After the new CS key set is generated, the MSC 32 may store the new CS key set locally. The UE 10 may then generate a new CS key set from the PS key and the NONCE. After generation of the new CS key set, the UE 10 may also store the new CS key set, for example, within a (U)SIM (UMTS subscriber identity module) of the UE 10. These procedures may be similar to conventional procedures. However, embodiments of the present invention may further employ an apparatus for key handling in the event of inter-domain handover operation failure (e.g., a handover failure).

Figure 2:
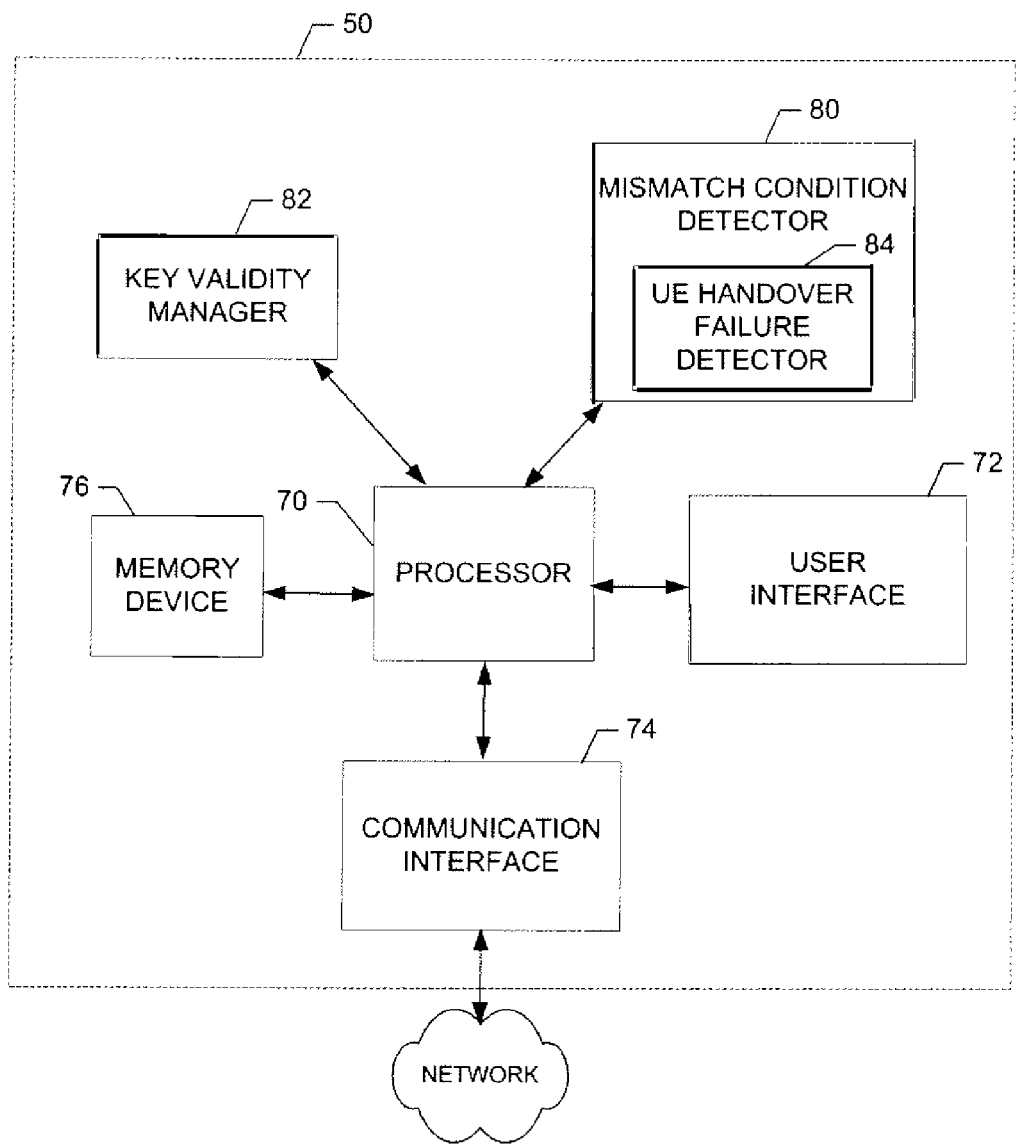
FIG. 2 illustrates a block diagram of an apparatus for enabling key handling for a handover between different domains according to an exemplary embodiment of the present invention.
Figure 3:
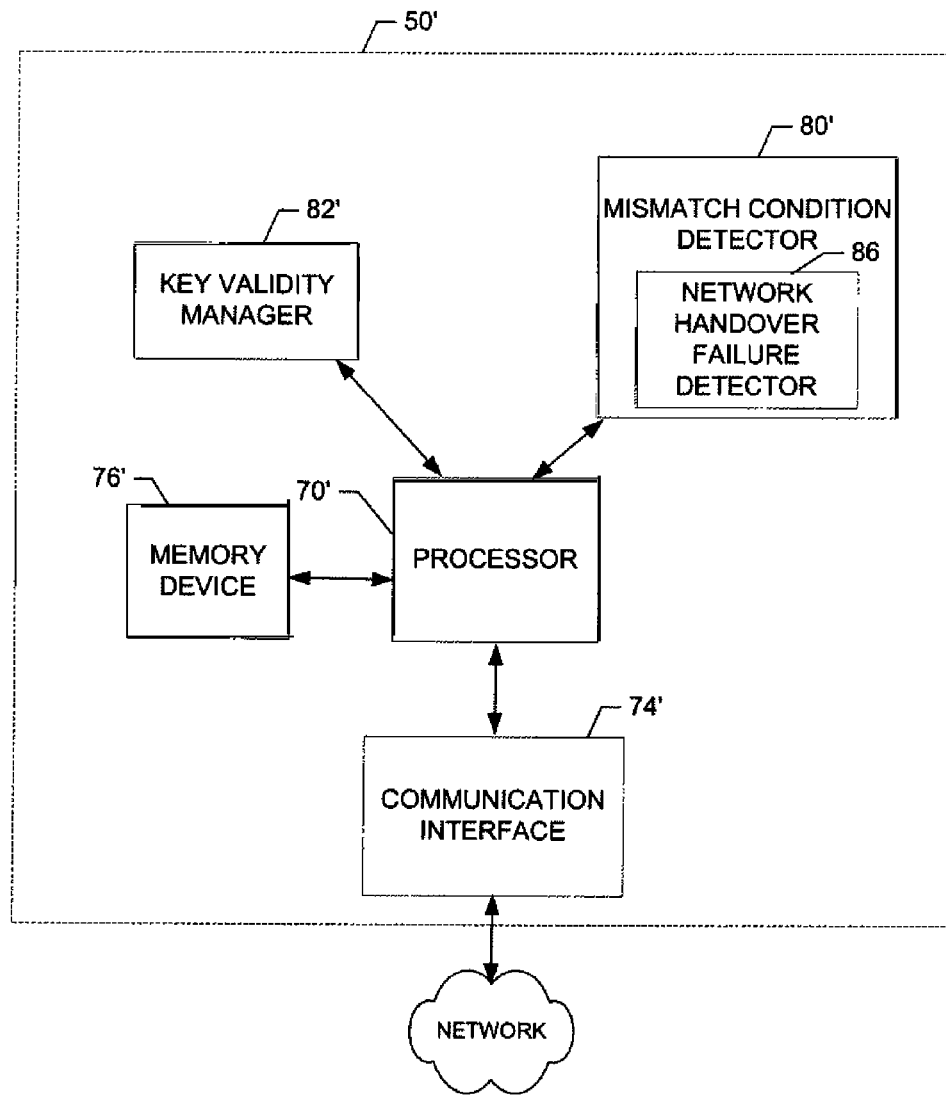
FIG. 3 illustrates a block diagram of an apparatus for enabling key handling for a handover between different domains according to an exemplary embodiment of the present invention.

FIGS. 2 and 3 illustrate block diagrams of an apparatus that may benefit from embodiments of the present invention. It should be understood, however, that the apparatus as illustrated and hereinafter described is merely illustrative of one apparatus that may benefit from embodiments of the present invention and, therefore, should not be taken to limit the scope of embodiments of the present invention. In one exemplary embodiment, the apparatus of FIG. 2 may be employed on a mobile terminal (e.g., UE 10) capable of communication with other devices via a network. In another exemplary embodiment, the apparatus of FIG. 3 may be employed at a network device (e.g., MSC 32) configured to manager or otherwise participate in coordination of inter-domain handovers. However, not all systems that may employ embodiments of the present invention are necessarily described herein. Moreover, other structures for apparatuses employing embodiments of the present invention may also be provided and such structures may include more or less components than those shown in FIGS. 2 and 3. Thus, some embodiments may comprise more or less than all the devices illustrated and/or described herein. Furthermore, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, an apparatus 50 for providing key handling following inter-domain handover failure is provided. The apparatus 50 may be employed in or embodied as a mobile terminal (e.g., the UE 10 of FIG. 1). The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to early out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated.

However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a mismatch condition detector 80 and a key validity manager 82. The mismatch condition detector 80 according to this embodiment may further include or otherwise be embodied as a UE handover failure detector 84. The mismatch condition detector 80, the key validity manager 82 and the UE handover failure detector 84 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the mismatch condition detector 80, the key validity manager 82 and the UE handover failure detector 84, respectively, as described herein. Thus, in examples in which software is employed, a device or circuitry (e.g., the processor 70 in one example) executing the software forms the structure associated with such means.

The mismatch condition detector 80 may be configured to determine, from the perspective of the UE 10, whether conditions exist that are likely indicators of a potential mismatch between the UE 10 and the MSC 32 in terms of the CS key sets stored therein. In this regard, for example, the mismatch condition detector 80 may be configured to monitor message traffic and activity of the UE 10 in response to generation of a new CS key during inter-domain handover operation in order to determine whether indications of a potential key mismatch condition are encountered. In response to indications of the potential key mismatch condition being encountered, the mismatch condition detector 80 according to an exemplary embodiment is configured to notify or otherwise inform the key validity manager 82.

The UE handover failure detector 84 may be configured to detect specific indicia that may be detectable at the UE 10 to indicate a handover failure or otherwise inter-domain handover operation failure from the UE perspective. In particular, for example, the UE handover failure detector 84 may be configured to determine whether the network acknowledges handover completion (e.g., a handover complete message). A failure to receive any acknowledgement of handover completion may be indicative of a handover failure. Additionally or alternatively, the UE handover failure detector 84 may be configured to determine whether the UE 10 achieves Layer 1 synchronization (e.g., L1 sync). Failure of the UE 10 to achieve L1 sync may also be indicative of a handover failure. Additionally or alternatively, the UE handover failure detector 84 may be configured to determine whether the received handover command contains valid configurations. Detection of any invalid configuration and/or any unsupported configuration may also be indicative of a handover failure. Additionally or alternatively, the UE handover failure detector 84 may be configured to determine whether the UE 10 attempts a handover failure fallback, as such an attempt would also be indicative of a handover failure. Other potential indicators of a handover failure may alternatively or additionally be detected by the UE handover failure detector 84.

The UE handover failure detector 84 may be configured to, on behalf of the mismatch condition detector 80, notify or otherwise inform the key validity manager 82 of the existence of indications of a potential key mismatch condition in response to a determination of any of the indications described above that are indicative of a handover failure. The key validity manager 82 may then alter activity at the UE 10 as described below. However, in situations in which the mismatch condition detector 80 (or the UE handover failure detector 84) does not signal a potential key mismatch condition, the UE 10 may store the new key set generated according to normal inter-domain handover procedures.

In response to receipt of an indication from the mismatch condition detector 80 (or the UE handover failure detector 84) that a potential key mismatch condition has been encountered, the key validity manager 82 may be configured to direct invalidation of the received new key set in the (U)SIM. The invalidation of the new key set may include or result in deletion of such key set, or the assignment of an indication attached to or associated with the key set to indicate the validity status of the key set. A new key set could have other matching key sets that have been used in the past. Accordingly, any other keyset with a key set identity (KSI or CKSN) matching the mapped keys associated with the inter-domain handover operation that could be confused during a subsequent connection may also be invalidated by the key validity manager 82. In response to invalidation of the mapped keys by the key validity manager 82, a new key exchange may be forced (e.g., via an AKA procedure). By forcing a new key exchange in a controlled fashion, as described above, in situations where a potential key mismatch condition is encountered, the key validity manager 82 may manage key validity at the UE 10 in a manner that is likely to prevent or at least substantially reduce the likelihood of encountering a communication failure or complications associated with key mismatches that are not proactively resolved (e.g., via the AKA procedure). In response to a new key set being indicated at the UE 10 side as being invalid by the key validity manager 82, the key validity manager 82 may be considered to have responded to a determination that it is unlikely that the network side has received confirmation of a successful handover and properly stored the same new key set (e.g., by virtue of the indications of potential key mismatch detected by the UE handover failure detector 84) by invalidating the new key set at the UE 10 side. In response to the new key set being invalidated at the UE 10 side, the most recent valid key set may be retained for use until a fresh key set can be provisioned.

Accordingly, despite the currently inherent inability to guarantee synchronization of storing mapped keys in both the network side and the UE side when a SR-VCC or other inter-domain handover fails, the apparatus 50 may be configured to reduce the likelihood of key mismatch related communication complications by managing key set validity based on indications of a potential key mismatch. The indications of a potential key mismatch may be detected based on activity of the UE 10 and messages received at the UE 10 in relation to confirming successful handover via inter-domain handover operation.

Referring now to FIG. 3, an apparatus 50' for providing key handling following inter-domain handover operation failure is provided. The apparatus 50' may include or otherwise be in communication with a processor 70', a communication interface 74' and a memory device 76'. As such, the apparatus 50' may be similar to the apparatus 50 of FIG. 2 except that it is adapted for employment at a network device instead of at the UE 10. As such, for example, the apparatus 50' may not necessarily include a user interface. However, the processor 70', communication interface 74' and the memory device 76' may be similar in function to the corresponding devices of the apparatus 50 of FIG. 2.

In an exemplary embodiment, the processor 70' may be embodied as, include or otherwise control a mismatch condition detector 80' and a key validity manager 82'. The mismatch condition detector 80' and the key validity manager 82' according to this embodiment may be similar to the mismatch condition detector 80 and key validity manager 82, respectively, of FIG. 2 except that they operate from a different perspective (e.g., the network perspective).

In an exemplary embodiment, the mismatch condition detector 80' may further include or otherwise be embodied as a network handover failure detector 86 that may also be similar to the UE handover failure detector 84 of FIG. 2 except that it operates from the perspective of a network device rather than from the perspective of a UE. Operation of the network handover failure detector 86 will be described in greater detail below.

The mismatch condition detector 80', the key validity manager 82' and the network handover failure detector 86 may each be any means such as a device or circuitry operating in accordance with software or otherwise embodied in hardware or a combination of hardware and software (e.g., processor 70' operating under software control, the processor 70' embodied as an ASIC or FPGA specifically configured to perform the operations described herein, or a combination thereof) thereby configuring the device or circuitry to perform the corresponding functions of the mismatch condition detector 80', the key validity manager 82' and the network handover failure detector 86, respectively, as described herein. Thus, in examples in which software is employed, a device or circuitry (e.g., the processor 70' in one example) executing the software forms the structure associated with such means.

The mismatch condition detector 80' may be configured to determine, from the perspective of the network, whether conditions exist that are likely indicators of a potential mismatch between the UE 10 and the MSC 32 in terms of the CS key sets stored therein. In this regard, for example, the mismatch condition detector 80' may be configured to monitor message traffic and activity of the network in response to provision of a new CS key to the UE 10 during inter-domain handover operation in order to determine whether indications of a potential key mismatch condition are encountered. In response to indications of the potential key mismatch condition being encountered, the mismatch condition detector 80' according to an exemplary embodiment is configured to notify or otherwise inform the key validity manager 82'.

The network handover failure detector 86 may be configured to detect specific indicia that may be detectable at the network (e.g., at the MSC 32, MME 36 or SGSN 34) to indicate a handover failure or otherwise inter-domain handover operation failure from the UE perspective. In particular, for example, the network handover failure detector 86 may be configured to determine whether the network has received an indication of handover completion (e.g., a handover complete message) from the UE 10. A failure to receive the indication of handover completion may be indicative of a handover failure. Additionally or alternatively, the network handover failure detector 86 may be configured to determine whether Layer 1 synchronization (L1 sync) is achieved. Failure to achieve L1 sync may also be indicative of a handover failure. Other potential indicators of a handover failure may alternatively or additionally be detected by the network handover failure detector 86.

The network handover failure detector 86 may be configured to, on behalf of the mismatch condition detector 80', notify or otherwise inform the key validity manager 82' of the existence of indications of a potential key mismatch condition in response to a determination of any of the indications described above that are indicative of a handover failure. The key validity manager 82' may then alter activity at the network (e.g., at the MSC 32, MME 36 or SGSN 34) as described below. However, in situations in which the mismatch condition detector 80' (or the network handover failure detector 86) does not signal a potential key mismatch condition, the MSC 32 may store the new CS key set provided to the UE 10 according to normal inter-domain handover operation procedures.

In response to receipt of an indication from the mismatch condition detector 80' (or the network handover failure detector 86) that a potential key mismatch condition has been encountered, the key validity manager 82' may be configured to direct invalidation of the new key set. The invalidation of the new key set may include or result in deletion of such key set, or the assignment of an indication attached to or associated with the key set to indicate the validity status of the key set. In response to invalidation of the mapped keys by the key validity manager 82', a new key exchange may be forced (e.g., via an AKA procedure). By forcing a new key exchange in a controlled fashion, as described above, in situations where a potential key mismatch condition is encountered, the key validity manager 82' may manage key validity at the network in a manner that is likely to prevent or at least substantially reduce the likelihood of encountering a communication failure or complications associated with key mismatches that are not proactively resolved (e.g., via the AKA procedure).

In response to a new key set being indicated at the network side as being invalid by the key validity manager 82', the key validity manager 82' may be considered to have responded to a determination that it is unlikely that the UE 10 side has also received and properly stored the same new key set (e.g., by virtue of the indications of potential key mismatch detected by the network handover failure detector 86) by invalidating the new key set at the network side. In response to the new key set being invalidated at the network side (e.g., by the MSC 32, MME 36 or SGSN 34), the most recent valid key set may be retained for use until a fresh key set can be provisioned.

Accordingly, despite the currently inherent inability to guarantee synchronization of storing mapped keys in both the network side and the UE side when an inter-domain handover fails, the apparatus 50' may be configured to reduce the likelihood of key mismatch related communication complications by managing key set validity based on indications of a potential key mismatch. The indications of a potential key mismatch may be detected based on activity of the network and messages received at the network in relation to confirming successful handover via inter-domain handover operation.

Figure 4:
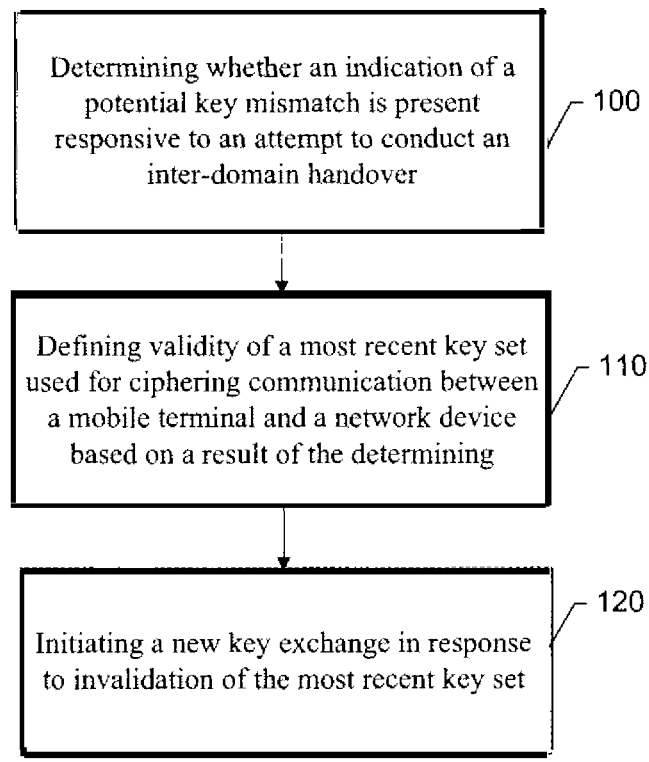
FIG. 4 is a flowchart according to an exemplary method of enabling key handling for a handover between different domains according to an exemplary embodiment of the present invention.

FIG. 4 is a flowchart of a system, method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s) or step(s). These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing key handling following a potential handover failure according to an exemplary embodiment, as shown in FIG. 4 includes determining whether an indication of a potential key mismatch is present responsive to an attempt to conduct a handover between a first domain (for example, PS domain) and a second (and different) domain (for example, CS domain) at operation 100. The method may further include defining validity of a most recent key set (e.g., CS key set) used for ciphering communication between a mobile terminal and a network device based on a result of the determining at operation 110.

In some embodiments, the method may include additional optional operations, an example of which is shown in clashed lines in FIG. 4. As such, for example, the method may further include initiating a new key exchange in response to invalidation of the most recent key set at operation 120.

In some embodiments, certain ones of the operations above may be modified or further amplified as described below. Modifications or amplifications to the operations above may be performed in any order and in any combination. In this regard, for example, determining whether the indication of the potential key mismatch is present may include determining whether an acknowledgement from the network device of a handover completion message sent by the mobile terminal is received at the mobile terminal. Additionally or alternatively, determining whether the indication of the potential key mismatch is present may include determining whether Layer 1 synchronization is determined. As yet another alternative or additional option, determining whether the indication of the potential key mismatch is present may include determining whether the mobile terminal attempts a handover failure fallback. In an alternative embodiment, determining whether the indication of the potential key mismatch is present may include determining whether the received handover command contains valid configurations. In some embodiments, determining whether the indication of the potential key mismatch is present may include determining whether a handover completion message is received from the mobile terminal at the network device. In an exemplary embodiment, defining validity of the most recent key set may include invalidating the most recent key set, at the network device or at the mobile terminal, in response to the presence of the indication of the potential key mismatch.

In an exemplary embodiment, an apparatus for performing the method of FIG. 4 above may comprise one or more processors (e.g., the processor 70 or 70') configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, the processor 70 or 70', respective ones of the mismatch condition detector 80 or 80', the key validity manager 82 or 82', the UE handover failure detector 84, the network handover failure detector 86, and/or a device or circuit for executing instructions or executing an algorithm for processing information as described above. An example of an apparatus according to an exemplary embodiment may include at least one processor and at least one memory including computer program code. The at least one memory and the computer program code may be configured to, with the at least one processor, cause the apparatus to perform the operations 100-120 (with or without the modifications described above). An example of a computer program product according to an exemplary embodiment may include at least one computer-readable storage medium having computer-executable program code portions stored therein. The computer-executable program code portions may include program code instructions for performing operation 100-120 (with or without the modifications described above). Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   determine, responsive to an attempt to conduct a handover between a first domain and a second domain, whether a potential key mismatch is present, wherein the presence of the potential key mismatch is determined by at least one of monitoring whether an acknowledgement to a handover completion message is received and monitoring whether layer 1 synchronization occurs; and
   define, based on a result of the determining, validity of a most recent key set used for ciphering communication between a mobile terminal and a network device.

2. The apparatus of claim 1, wherein the memory and computer program code are further configured to, with the processor, cause the apparatus to initiate a new key exchange in response to invalidation of the most recent key set.

3. The apparatus of claim 1, wherein the presence of the potential key mismatch is further determined by at least one of monitoring whether the mobile terminal attempts a handover failure fallback.

4. The apparatus of claim 1, wherein the presence of the potential key mismatch is further determined by at least one of monitoring whether a received handover command contains valid configurations.

5. The apparatus of claim 1, wherein the presence of the potential key mismatch is further determined by at least one of monitoring whether a handover completion message is received from the mobile terminal at the network device.

6. The apparatus of claim 1, wherein the memory and computer program code are configured to, with the processor, cause the apparatus to define validity of the most recent key set by invalidating the most recent key set, at the network device or at the mobile terminal, in response to the presence of the potential key mismatch.

7. The apparatus of claim 1, wherein the apparatus is a mobile terminal and further comprises user interface circuitry configured to facilitate user control of at least one function of the mobile terminal.

8. A method comprising:
   determining, responsive to an attempt to conduct a handover between a first domain and a second domain, whether a potential key mismatch is present, wherein the presence of the potential key mismatch is determined by at least one of monitoring whether an acknowledgement to a handover completion message is received and monitoring whether layer 1 synchronization occurs; and defining, based on a result of the determining, validity of a most recent key set used for ciphering communication between a mobile terminal and a network device.

9. The method of claim 8, further comprising initiating a new key exchange in response to invalidation of the most recent key set.

10. The method of claim 8, wherein the presence of the potential key mismatch is further determined by at least one of monitoring whether the mobile terminal attempts a handover failure fallback.

11. The method of claim 8, wherein the presence of the potential key mismatch is further determined by at least one of monitoring whether a received handover command contains valid configurations.

12. The method of claim 8, wherein the presence of the potential key mismatch is further determined by at least one of monitoring whether a handover completion message is received from the mobile terminal at the network device.

13. The method of claim 8, wherein defining validity of the most recent key set comprises invalidating the most recent key set, at the network device or at the mobile terminal, in response to the presence of the potential key mismatch.

14. A non-transitory computer-readable storage medium including computer program code, which when executed by at least one processor provides operations comprising:

determining, responsive to an attempt to conduct a handover between a first domain and a second domain, whether a potential key mismatch is present, wherein the presence of the potential key mismatch is determined by at least one of monitoring whether an acknowledgement to a handover completion message is received and monitoring whether layer 1 synchronization occurs; and defining, based on a result of the determining, validity of a most recent key set used for ciphering communication between a mobile terminal and a network device.

15. The non-transitory computer-readable storage medium of claim 14, further comprising initiating a new key exchange in response to invalidation of the most recent key set.

16. The non-transitory computer-readable storage medium of claim 14 further comprising invalidating the most recent key set, at the network device or at the mobile terminal, in response to the presence of the potential key mismatch.

* * * * *